US012739960B2

(12) United States Patent
Liu et al.

(10) Patent No.: US 12,739,960 B2
(45) Date of Patent: Sep. 15, 2026

(54) SMART POWER SYSTEM AND METHOD TO PROTECT AN X-RAY TUBE DURING A POWER OUTAGE

(71) Applicant: GE Precision Healthcare LLC, Waukesha, WI (US)

(72) Inventors: Xiaoxu Liu, Hartland, WI (US); Tao Hou, Brookfield, WI (US); David Pitterle, Waukesha, WI (US); Yoshio Takaichi, Brookfield, WI (US)

(73) Assignee: GE Precision Healthcare LLC, Waukesha, WI (US)

( * ) Notice: Subject to any disclaimer, the term of this patent is extended or adjusted under 35 U.S.C. 154(b) by 109 days.

(21) Appl. No.: 18/651,266

(22) Filed: Apr. 30, 2024

(65) Prior Publication Data

US 2025/0338383 A1 Oct. 30, 2025

(51) Int. Cl.

| | |
|---|---|
| ***H05G 1/46*** | (2006.01) |
| ***H05G 1/02*** | (2006.01) |
| ***H05G 1/10*** | (2006.01) |
| ***H05G 1/26*** | (2006.01) |
| ***H05G 1/32*** | (2006.01) |

(Continued)

(52) U.S. Cl.

CPC ............... *H05G 1/46* (2013.01); *H05G 1/025* (2013.01); *H05G 1/10* (2013.01); *H05G 1/265* (2013.01); *H05G 1/32* (2013.01); *H05G 1/36* (2013.01); *H05G 1/56* (2013.01); *H05G 1/58* (2013.01); *H01J 35/104* (2019.05); *H01J 35/107* (2019.05)

(58) Field of Classification Search

CPC ........... H05G 1/46; H05G 1/025; H05G 1/10; H05G 1/265; H05G 1/32; H05G 1/36; H05G 1/56; H05G 1/58; H05G 1/54; H01J 35/104; H01J 35/107; A61B 6/032; A61B 6/4488; A61B 6/586; A61B 6/56; H02J 9/06

See application file for complete search history.

(56) References Cited

U.S. PATENT DOCUMENTS

| | | | | |
|---|---|---|---|---|
| 11,818,827 B2 | | 11/2023 | Mirzaei | |
| 2011/0007877 A1 | * | 1/2011 | Legall .................. | H01J 35/104 445/28 |

(Continued)

FOREIGN PATENT DOCUMENTS

| | | | | | |
|---|---|---|---|---|---|
| EP | 4300767 A2 | | 1/2024 | | |
| JP | 2022076261 A | | 5/2022 | | |
| JP | 7102433 B2 | * | 7/2022 | .......... | H02J 7/00047 |

OTHER PUBLICATIONS

EP application 25169555.7 filed Apr. 9, 2025—extended Search Report issued Sep. 9, 2025; 8 pages.

(Continued)

*Primary Examiner* — Kiho Kim

(57) ABSTRACT

A smart power system and method to protect an X-ray tube of a CT imaging system during a power outage, the system and method comprising monitoring a remining amount of power from a backup power source supplied by an UPS coupled to a PDU that is providing power to the CT imaging system. The X-ray tube having a liquid metal bearing rotating assembly. The system and method automatically strategizing and determining where to supply the remaining amount of backup power to prevent a hot landing of the X-ray tube liquid metal bearing rotating assembly.

18 Claims, 7 Drawing Sheets

(51) Int. Cl.

| | |
|---|---|
| ***H05G 1/36*** | (2006.01) |
| ***H05G 1/56*** | (2006.01) |
| ***H05G 1/58*** | (2006.01) |
| *H01J 35/10* | (2006.01) |

(56) References Cited

U.S. PATENT DOCUMENTS

| | | | |
|---|---|---|---|
| 2022/0146611 | A1 | 5/2022 | Nakabayashi |
| 2022/0393503 | A1 | 12/2022 | Mirzaei |

OTHER PUBLICATIONS

JP application 2025-061587 filed Apr. 3, 2025—Office Action issued Apr. 1, 2026; Machine Translation; 5 pages.

* cited by examiner

SMART POWER SYSTEM AND METHOD TO PROTECT AN X-RAY TUBE DURING A POWER OUTAGE

TECHNICAL FIELD

Embodiments of the subject matter disclosed herein relate to providing a smart power system and method to protect an X-ray tube during a power outage.

BACKGROUND

A computerized tomography (CT) imaging system may receive power from a main power source, such as a utility power source. The utility power source may be connected to a utility power grid. During some conditions, the main power source may not be provided (i.e., may not be available for use by the CT imaging system) in response to power outages, power grid instability, component failures or other reasons.

Certain components within a CT imaging system, such as an X-ray source or X-ray tube may need to cool down during a shutdown before the main power source is turned off from the CT imaging system. Unexpected power outages may damage certain components, such as the X-ray source or X-ray tube in the CT imaging system. To protect these vulnerable components and extend their life, it may be desirable to provide backup power during unexpected interruptions or power outages of the main power source in order to provide a cool down routine of vulnerable components when the main power source is not available.

A hot landing of an X-ray tube having a liquid metal bearing may occur during an X-ray generator test or a power outage. When a rotating assembly of a liquid metal bearing is landed (i.e., rotation stopped when bearing is hot) in a uncontrolled way, due to an interruption or loss or power to the X-ray tube, especially when the X-ray tube is hot, there is a possibilty of bearing seizures, where a rotating member of the bearing may fuse with a stationary member of the bearing requiring replacement of the X-ray tube and therefore causing CT imaging system downtime. Replacement of the X-ray tube also includes one or more calibration routines further prolonging system downtime.

Therefore, there is a need for a system and method to provide backup power to an X-ray tube during an interruption or outage of main power, allowing the X-ray tube to cool down and the rotating assembly of the liquid metal bearing to gradually coast to a stop.

SUMMARY

This summary introduces concepts that are described in more detail in the detailed description. It should not be used to identify essential features of the claimed subject matter, nor to limit the scope of the claimed subject matter.

In an aspect, a method for providing backup power to a computed tomography (CT) imaging system. The method comprising monitoring the availability of power from a main power source to the CT imaging system; providing backup power to the CT imaging system via an uninterruptible power supply (UPS); distributing, via a power distribution unit (PDU), the backup power from the UPS to the CT imaging system; initiating a cooling sequence for an X-ray tube of the CT imaging system; and monitoring, during the cooling sequence, the remaining backup power from the UPS.

In another aspect, a computed tomography (CT) imaging system, comprising a gantry; an X-ray source including an X-ray Generator and an X-ray tube; coupled to the gantry; a gantry controller coupled to the gantry; an X-ray controller coupled to the X-ray source; a power distribution unit (PDU) coupled to the gantry; a main power source coupled to the PDU for supplying power to the CT imaging system; a PDU controller coupled to the PDU; and an uninterruptable power supply (UPS) coupled to the PDU to provide backup power to the CT imaging system. The PDU is configured to distribute the backup power from the UPS to the CT imaging system during a power outage of the main power source. The gantry controller is configured to initiate a cooling sequence for the X-ray tube during the power outage of the main power source.

In yet another aspect, a smart power system and method to protect an X-ray tube of a CT imaging system during a power outage, the system and method comprising monitoring a remining amount of power from a backup power source supplied by an UPS coupled to a PDU that is providing power to the CT imaging system. The X-ray tube having a liquid metal bearing rotating assembly. The system and method automatically strategizing and determining where to supply the remaining amount of backup power to prevent a hot landing of the X-ray tube liquid metal bearing rotating assembly.

BRIEF DESCRIPTION OF THE DRAWINGS

The present disclosure will be better understood from reading the following detailed description of non-limiting embodiments, with reference to the drawings.

DETAILED DESCRIPTION

Embodiments of the present disclosure will now be described, by way of example, with reference to the Figures, in which a smart power system and method, including a power distribution unit (PDU), an uninterrupted power supply (UPS), and operational software or firmware to provide backup power to certain components of a computed tomography (CT) imaging system that may be damaged as a result of an interruption or a power outage of the main power source. When there is an interruption or a power outage of the main power source the smart power system and method will detect an interruption or power outage and switch power from the UPS to certain components of a computed tomography (CT) imaging system, such as the X-ray source, to protect an X-ray tube during a power outage. For example, an X-ray tube having a liquid metal bearing may be damaged during a hot landing of the liquid metal bearing. When a rotating assembly of a liquid metal bearing is hot landed (i.e., rotation stopped when bearing is hot) in a uncontrolled way, due to an interruption or loss or power to the X-ray tube, especially when the X-ray tube is hot, there is a possibilty of bearing seizures, where a rotating member of the bearing may fuse with a stationary member of the bearing requiring replacement of the X-ray tube. In an exemplary embodiment, this disclosure provides a system and method to strategically cool down and land the liquid metal bearing rotating assembly of an X-ray tube during a power outage.

Figure 1:
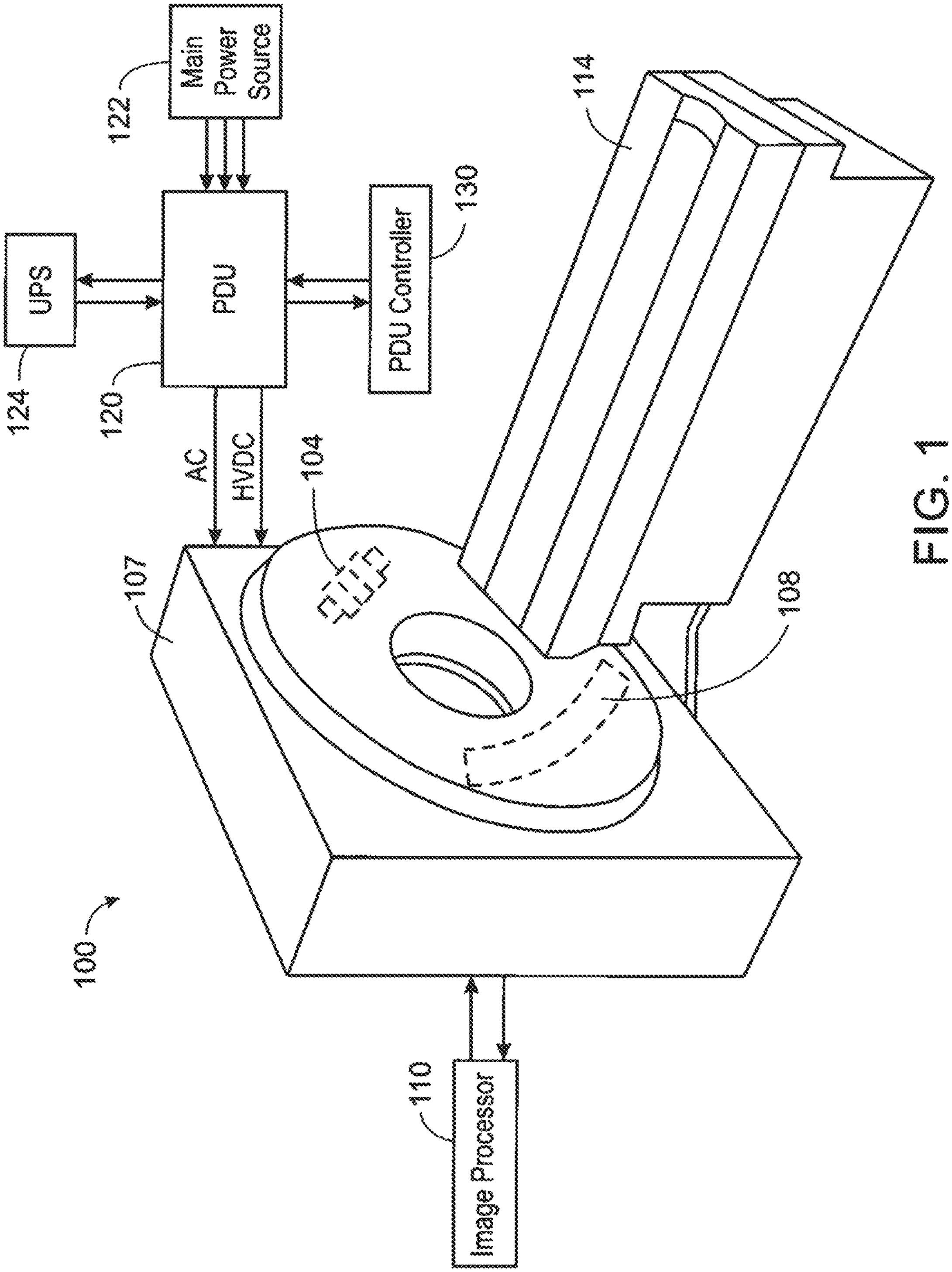
FIG. 1 illustrates a pictorial view of a computed tomography (CT) imaging system coupled to a main power source and other power components, according to an embodiment.

Referring to the drawings, FIG. 1 is an exemplary embodiment of a computed tomography (CT) imaging system 100 configured for imaging a subject, such as a patient, an object, or other components. The CT imaging system 100 includes a gantry 107, the gantry 107 having a rotating gantry assembly and a stationary (i.e., non-rotating) gantry assembly. The rotating gantry assembly includes at least one X-ray source 104 configured to project a beam of X-ray radiation 106 (i.e., X-ray beam) or X-rays towards a subject 204 (see FIG. 2) being imaged. The rotating gantry assembly further includes at least one X-ray detector assembly 108 located and positioned directly across from the X-ray source 104 on the rotating gantry assembly. The X-ray source 104 is configured to project an X-ray beam 106 towards the X-ray detector assembly 108 positioned on the opposite side of the gantry 107. The at least one X-ray detector assembly 108 may include a plurality of X-ray detector elements or sensors (not shown) that are arranged in an array (i.e., X-ray detector array). Although FIG. 1 shows only a single X-ray source 104, in other exemplary embodiments, multiple X-ray sources and X-ray detectors may be implemented to project a plurality of X-ray beams 106 towards a subject and the X-ray detectors for acquiring projection image data at different energy levels. In some embodiments, the at least one X-ray source 104 may enable dual-energy or multi-energy spectral imaging by rapid switching of the voltage potential (kVp) applied across the cathode and anode of the X-ray source. In some embodiments, the X-ray detector may be an energy integrating detector (EID) or a photon counting detector (PCD) which is capable of differentiating X-ray photons of different energies. In other embodiments, two sets of X-ray sources and detectors may be used to generate dual-energy projections, using one set configured at a low kVp and the other set configured at a high kVp. It should thus be appreciated that the systems and methods described herein may be implemented with single energy acquisition techniques as well as dual or multi energy acquisition techniques.

In certain embodiments, the CT imaging system 100 further includes an image processor 110 configured to reconstruct images of a target volume of a subject being imaged using an iterative or analytic image reconstruction method. For example, the image processor 110 may use an analytic image reconstruction approach such as filtered back projection (FBP) to reconstruct images of a target volume of the patient. As another example, the image processor 110 may use an iterative image reconstruction approach such as advanced statistical iterative reconstruction (ASIR), conjugate gradient (CG), maximum likelihood expectation maximization (MLEM), model-based iterative reconstruction (MBIR), and other iterative image reconstruction methods to reconstruct images of a target volume of the subject. As described further herein, in certain other embodiments, the image processor 110 may use both an analytic image reconstruction approach such as FBP in addition to an iterative image reconstruction approach.

In some CT imaging system configurations, an X-ray source projects a cone-shaped X-ray beam (i.e., cone-beam scan) which is collimated to lie within an X-Y-Z plane of a Cartesian coordinate system and generally referred to as an "imaging plane." The X-ray beam passes through a subject being imaged, such as the patient. The X-ray beam, after being attenuated by the subject, impinges upon an array of X-ray detector elements. The intensity of the attenuated X-ray beam received at the X-ray detector elements is dependent upon the attenuation of X-rays by the subject. Each X-ray detector element of the X-ray detector array produces a separate electrical signal that is a measurement of the X-ray attenuation at the X-ray detector element location. The attenuation measurements from all the X-ray detector elements are acquired separately to produce a profile of image data.

As mentioned previously, in some CT imaging systems, the X-ray source and the X-ray detector array are rotated by a rotating gantry assembly within the imaging plane and around the subject being imaged such that an angle at which the X-ray beam intersects the subject constantly changes. A group of X-ray attenuation measurements, e.g., projection data, from the X-ray detector array at one gantry angle is referred to as a "view." A "scan" of the subject includes a set of views made at different gantry angles, or view angles, during one revolution of the X-ray source and detector.

The projection data is processed to reconstruct an image that corresponds to a two-dimensional slice taken through the subject or, in some examples where the projection data includes multiple views or scans, a three-dimensional (3D) rendering of the subject. As mentioned above, one method for reconstructing an image from a set of projection data is referred to in the art as a filtered back projection (FBP) technique. Transmission and emission tomography reconstruction techniques also include statistical iterative methods such as maximum likelihood expectation maximization (MLEM) and ordered-subsets expectation-reconstruction techniques as well as other iterative reconstruction techniques. This process converts the attenuation measurements from a scan into integers called "CT numbers" or "Hounsfield units," (HU) which are used to control the brightness of a corresponding pixel on a display device.

To reduce the total scan time, a "helical" scan may be performed. To perform a "helical" scan, a patient is moved while being imaged during image acquisition scanning while data for the prescribed number of slices is acquired. Such a system generates a helix from a cone beam helical scan. This helical cone beam image acquisition scan yields projection data from which images in each prescribed slice may be reconstructed.

As used herein, the phrase "reconstructing an image" is not intended to exclude embodiments of the present disclosure in which data representing an image is generated but a viewable image is not. Therefore, as used herein, the term "image" broadly refers to both viewable images and data representing a viewable image. However, many embodiments generate (or are configured to generate) at least one viewable image.

FIG. 1 further illustrates the CT imaging system 100 receiving power from a main power source 122, such as a utility power source supplied by an electrical grid, or from an uninterruptible power source (UPS) 124 through a power distribution unit (PDU) 120. The PDU is controlled by and electrically coupled to a PDU controller 130. The main power source 122 is electrically coupled to and supplies three-phase AC power to the PDU 120. The UPS 124 is electrically coupled to the PDU 120. The PDU 120 is electrically coupled to and supplies AC and high-voltage DC (HVDC) power to the CT imaging system 100. The UPS 124 is configured to act as a backup power supply to the CT imaging system 100 during interruptions or outages of the main power source 122.

In an exemplary embodiment, the PDU 120 may include one or more sensors configured to sense the availability of power from the main power source 122. The PDU controller 130 may be configured to receive feedback from the one or more sensors and control one or more actuators in response to the availability of power from the main power source 122 as well as command signals from a gantry control board located in the gantry 107. The one or more actuators may be actuated after a specific time delay or delay period as measured by a timer. In one exemplary embodiment, the one or more actuators are contactors and/or switches, configured to transfer power to the CT imaging system from the main power source 122 to the UPS 124 based on the availability of power from the main power source 122. In an exemplary embodiment, if there is a power outage or interruption of power from the main power source 122, then the PDU controller 130 may send at least one signal to actuate at least one contactor or switch to open the circuit coupling the main power source 122 to the CT imaging system and to actuate at least one contactor or switch to close the circuit coupling the UPS 124 to the CT imaging system, as will be described in greater detail below.

The PDU controller 130 may include at least one printed circuit board (PCB) with a plurality of electronic components with executable instructions stored in memory of at least one of the plurality of electronic components that when executed cause the PDU controller 130 to send signals to control the contactors to transfer power to the CT imaging system between the main power source 122 and the UPS 124 based on the availability of power from the main power source 122. Power from the main power source 122 may be detected via a current sensor, a voltage sensor, or other type of power sensor. Feedback from a power sensor may trigger the PDU controller 130 to send signals to actuate contactors or switches coupling or decoupling the main power source 122 while also actuating contactors or switches decoupling or coupling the UPS 124 after a time delay to switch connection from the main power source 122 to the UPS 124 to output loads of the PDU 120 to power the CT imaging system 100.

Figure 2:
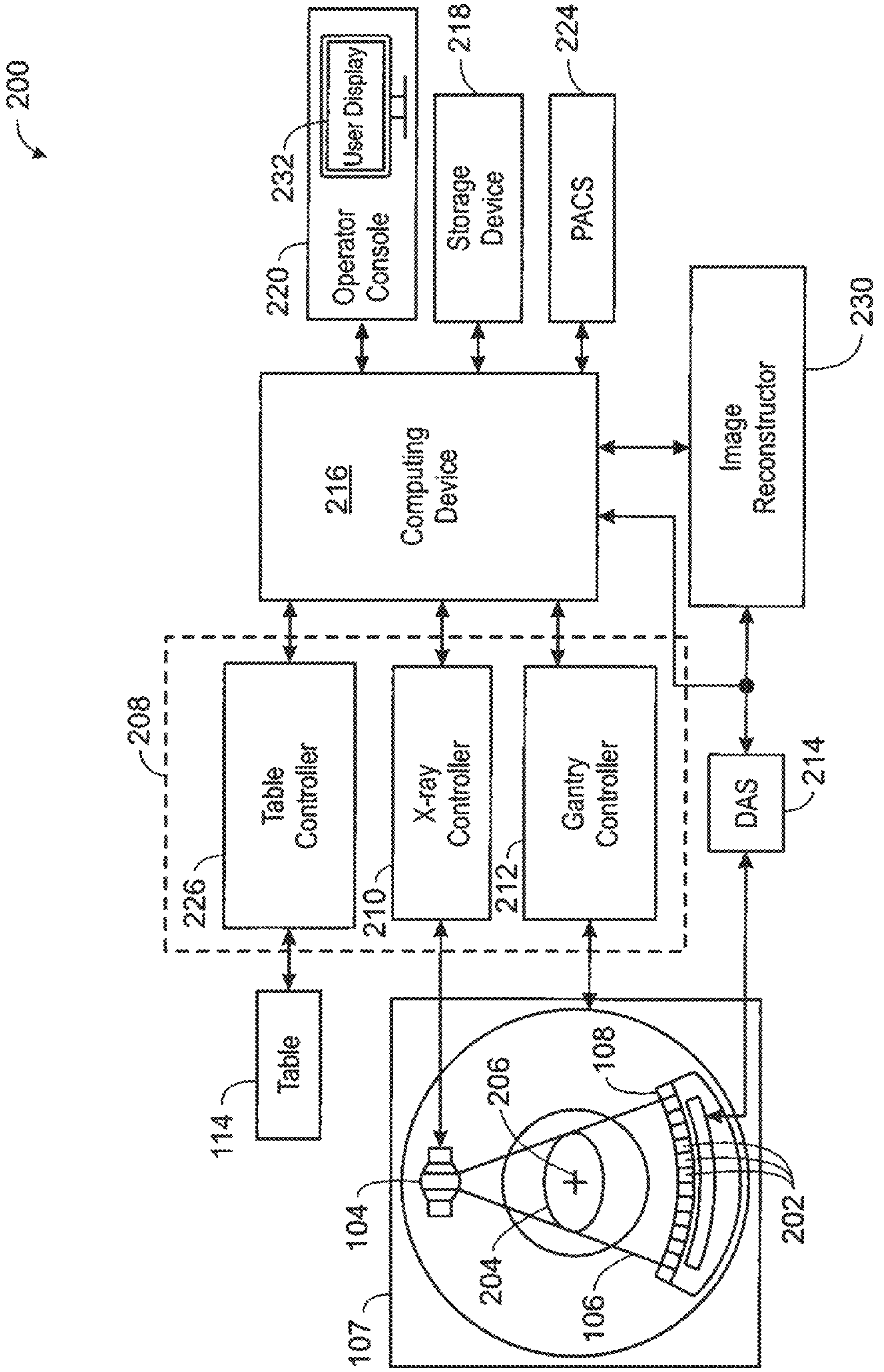
FIG. 2 illustrates a block diagram of a CT imaging system, according to an embodiment.

FIG. 2 is an exemplary embodiment of a block diagram of a CT imaging system 200, similar to the CT imaging system 100 of FIG. 1. In accordance with aspects of the present disclosure, the CT imaging system 200 is configured for imaging a subject 204. In an exemplary embodiment, the CT imaging system 200 includes an X-ray source 104, and an X-ray detector array 108 within a gantry 107 of the CT imaging system 200. The X-ray detector array 108 includes a plurality of X-ray detector elements 202 that together measure X-rays from an attenuated X-ray beam 106 after passing through the subject 204, such as a patient, being imaged to acquire corresponding projection image data. Accordingly, in an exemplary embodiment, the X-ray detector array 108 is fabricated in a multi-slice configuration including a plurality of rows of detector elements 202. In such a configuration, one or more additional rows of detector elements 202 may be arranged in a parallel configuration for acquiring projection image data.

In certain embodiments, the CT imaging system 200 is configured to traverse different angular positions around the subject 204 for acquiring desired projection image data. Accordingly, the gantry 107 and the components mounted thereon may be in the form of a rotating gantry assembly configured to rotate about a center of rotation 206 for acquiring the projection image data. As the X-ray source 104 and the X-ray detector array 108 are rotated around the subject 204, the X-ray detector array 108 measures and collects data of the attenuated X-rays. The data collected by the X-ray detector array 108 undergoes pre-processing. The pre-processed data is commonly called projection data. In certain embodiments, the X-ray detector array 108 may be configured as an energy integrating detector (EID) or as a photon counting detector (PCD).

In an exemplary embodiment, the acquired projection data may be used for basis material decomposition (BMD). During BMD processes, the measured projection data is converted to material density projection data. The material density projection data may be reconstructed to form a set of material density maps or images of each of a respective basis material, such as bone, soft tissue, and/or contrast agent maps, etc. These material density maps or images may be used to form a volume rendering of the basis material, for example, bone, soft tissue, and/or contrast agent, etc. in an imaged volume.

Image reconstruction of basis material images produced by the CT imaging system 200 reveals internal features of the subject 204, expressed in the densities of the basis materials. The density images may be displayed to show the internal features. In traditional approaches to diagnosis of medical conditions, such as disease states, a radiologist, physician or other medical practitioner may review the density images to discern certain features of interest. Such features might include lesions, tumors, sizes and shapes of particular anatomies or organs, and other features that would be discernable in the images based upon the skill and knowledge of the individual radiologist, physician or other medical practitioner.

Referring further to FIG. 2, the CT imaging system 200 may include a controller subsystem 208 to control operation of various components of the CT imaging system 200. The controller subsystem 208 includes a table controller 208 for controlling movement of a table 114, an X-ray controller 210 for controlling operation of the X-ray source 104, and a gantry controller 212 for controlling operation and rotation of the rotating gantry assembly of the gantry 107.

The CT imaging system 200 further includes a data acquisition system (DAS) 214 configured to receive analog data from the detector elements 202 and convert the analog data to digital data for subsequent processing. The data received and digitized by the DAS 214 is transmitted to a computing device 216 and/or an image reconstructor for processing. In one example, the computing device 216 may be one or more computers that store the digital data in memory or in a storage device 218 coupled to the computing device 216.

Additionally, the computing device 216 is coupled to and may provide commands and/or parameters to one or more of the table controller 226, the X-ray controller 210, the gantry controller 212, the DAS 214 and/or an image reconstructer 230 for controlling system operations such as image acquisition, data measurement and collection, and/or processing. In certain embodiments, the computing device 216 controls system operations of the CT imaging system. The computing device 216 may receive operator input from a technologist or operator of the CT imaging system, for example, including commands, scanning parameters, imaging or scanning protocols, requesting examinations, plotting data, and/or viewing data and/or images via an operator console 220 operatively coupled to the computing device 216. The operator console 220 may include at least one user display 232, a keyboard, a touchscreen or other input device to allow the technologist or operator to control operation of the CT imaging system 200.

Although FIG. 2 illustrates only one operator console 220, more than one operator console or workstation may be coupled to the CT imaging system 200, for example, for inputting commands, scanning parameters, imaging or scanning protocols, requesting examinations, plotting data, and/or viewing data and/or images. Further, in certain embodiments, the imaging system 200 may be coupled to multiple displays, printers, workstations, and/or similar devices located either locally or remotely, for example, within a medical facility or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In an exemplary embodiment, the CT imaging system 200 may either include, or be coupled to, a picture archiving and communications system (PACS) 224. In another exemplary embodiment, the PACS 224 may be further coupled to a remote system such as a radiology information system, hospital information system (RIS/HIS), and/or to an internal or external network (not shown) to allow people at different locations to supply commands and parameters and/or gain access to image data.

The computing device 216 may use operator-supplied and/or system-defined commands and parameters to operate the table controller 226, which in turn, may control movement of the table 114, which may be a motorized table. Specifically, the table controller 226 may move the table 114 for appropriately positioning the subject 204, such as a patient, on the table within an opening or bore of the gantry 107 for acquiring projection data corresponding to the target volume of the subject 204 being imaged.

As previously mentioned, the DAS 214 samples and digitizes projection data acquired by the detector elements 202. Subsequently, an image reconstructor 230 coupled to the DAS 214 and the computing device 216 uses the measured and digitized X-ray data to perform high-speed image reconstruction. Although FIG. 2 illustrates the image reconstructor 230 as a separate component, in certain embodiments, the image reconstructor 230 may be included within the computing device 216, one or more processors, an edge computer, or one or more servers, including cloud computing capabilities. As mentioned, the image reconstructor 230 may not be a separate component of the CT imaging system 200 and instead the computing device 216 may perform one or more functions of the image reconstructor 230. Moreover, the image reconstructor 230 may be located locally or remotely, and may be operatively connected to the imaging system 200 using a wired or wireless network. In another exemplary embodiment, computing resources available in a "cloud" network may be used to perform one or more functions of the image reconstructor 230.

In an exemplary embodiment, the image reconstructor 230 may store reconstructed images in the storage device 218. Alternatively, the image reconstructor 230 may transmit the reconstructed images to the computing device 216 for generating useful patient information for evaluation and diagnosis. In certain embodiments, the computing device 216 may transmit the reconstructed images and/or the patient information to the user display 232 for viewing. In some embodiments, the reconstructed images may be transmitted from the computing device 216 or the image reconstructor 230 to the storage device 218 for short-term or long-term storage.

The UPS 124 of FIG. 1 may be used as a backup power source to supply power to the computing device 216 and auxiliary components thereof (e.g., the operator console 220 and/or user display 232, etc.) during an interruption or outage of the main power source. As will be described in more detail herein, the PDU 120 and the UPS 124 of FIG. 1 are configured to not only supply backup power to the computing device 216 and auxiliary components thereof, but also to supply backup power to components within the rotating gantry assembly, such as the X-ray source, X-ray generator, and X-ray controller during an interruption or outage of the main power source. During normal operations, when the main power source is available, the main power source is used to charge a backup power source of the UPS, such as a plurality of the batteries and/or capacitors in the UPS.

Figure 3:
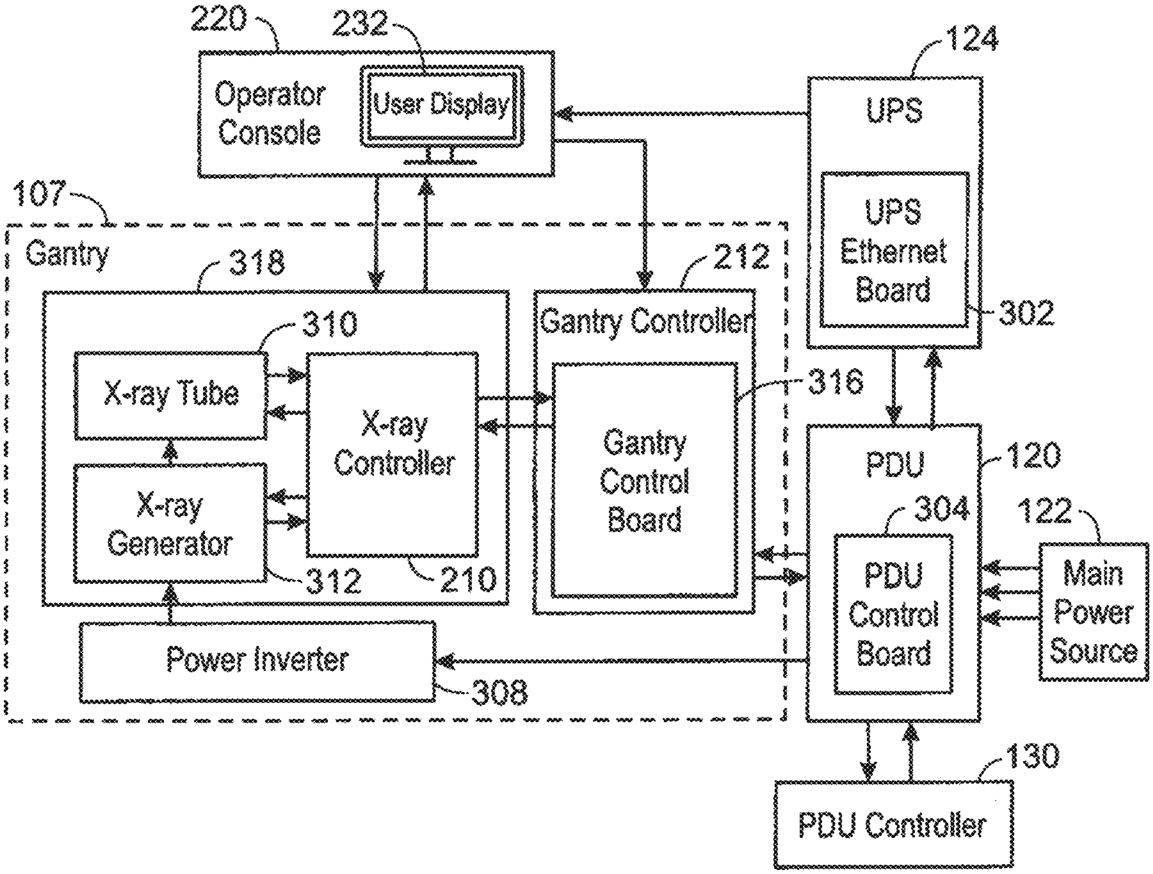
FIG. 3 illustrates a block diagram of portions of a rotating gantry assembly (i.e., rotating side of gantry) and other components on a stationary gantry assembly (i.e., stationary side of gantry) of a gantry of a CT imaging system with power components and an operator console coupled thereto, according to an embodiment.

FIG. 3 is a block diagram of portions of a rotating gantry assembly 318 (i.e., rotating side of gantry) and other components on a stationary gantry assembly (i.e., stationary side of gantry) of a gantry 107 of a CT imaging system with power components and an operator console coupled thereto. Similar to what is shown in FIG. 1, a main power source 122, such as a utility power source, is electrically coupled to a PDU 120, which is electrically coupled to an UPS 124 and a PDU controller 130. The UPS 124 is used to provide backup power during an interruption or outage of the main power source 122. The UPS 124 may include a plurality of batteries or a plurality of storage capacitors to store backup power, which may be used in the event of a main power interruption or main power outage. The UPS 124 includes a UPS ethernet board 302 that may communicate with a PDU control board 304 within the PDU 120 and an operator console 220. The PDU control board 304 may communicate with a gantry control board 316 within the gantry controller 212, and be configured to detect the availability of power from the main power source 122.

In an exemplary embodiment, the PDU control board 304 may include sensor circuitry, including one or more sensors, for continuously monitoring the availability of the main power source 122, to detect power interruptions or power outages in real time. In an exemplary embodiment, the PDU control board 304 may be configured to receive signals from the one or more sensors and control one or more actuators in response to the availability of power from the main power source 122, as well as send signals to one or more of the operator console 220 and/or the gantry control board 316 indicating the availability of power from the main power source 122. These signals may be routed through and/or processed by the computing device 216.

In an exemplary embodiment, when the PDU control board 304 detects a power interruption or power outage from the main power source 122, the PDU control board 304 automatically switches the CT imaging device from receiving power from the main power source 122 to receiving power from the UPS 124 or backup power source, and ensure a safe landing of an X-ray tube liquid metal bearing rotating assembly. If the PDU control board 304 detects a restoration of power from the main power source 122, the PDU control board 304 automatically switches the CT imaging device back to receiving power from the main power source and returning to normal operating conditions without input from a technologist or an operator.

In an exemplary embodiment, the main power source 122 is electrically coupled to the PDU 120. The PDU 120 is electrically coupled to the PDU controller 130, the UPS 124 and the gantry controller 212. When power from the main power source 122 is interrupted or lost, a smart power system or method will automatically switch the CT imaging system power source from the main power source 122 to the UPS 124, a backup power source, which will supply backup power to the CT imaging system, including the operator console 220 and gantry 107. The portion of the gantry 107 shown in FIG. 3 includes a gantry controller 212 with a gantry control board 316 coupled to a rotating gantry assembly 318 (i.e., rotating side of gantry). The gantry control board 316 is coupled to an X-ray controller 210. The gantry control board 316 is also coupled to the operator console 220. The portion of the gantry 107 shown in FIG. 3 also includes a power inverter 308, which is coupled to the rotating gantry assembly 318. The rotating gantry assembly 318 includes an X-ray controller 210 coupled to an X-ray generator and an X-ray tube 310. The X-ray generator 312 is coupled to and provides power to the X-ray tube 310. The X-ray controller is further coupled to the operator console 220. The power inverter 308 is specifically coupled to the X-ray generator 312. The power inverter 308 receives DC power from the PDU 120 and converts the DC power to AC power for input to the X-ray generator 312.

During a power outage or loss of main power source 122, the UPS 124 provides backup power to enable the CT imaging system 100 to complete a cooling sequence that cools down the X-ray tube liquid metal bearing before powering off the CT imaging system or returning the CT imaging system to normal operation. The backup power from the UPS 124 or from the main power source is supplied to the X-ray generator 312 by the power inverter 308. The X-ray controller 210 may receive commands from the operator console 220 to turn on or off the rotating gantry assembly 318. For example, during a cool down operation of the X-ray tube 310, the X-ray controller 210 may receive at least one command from the operator console 220 to initiate the cool down operation of the X-ray tube by removing power from the X-ray generator 312 and X-ray tube 310 causing the liquid metal bearing rotating assembly of the X-ray tube to coast to a natural stop. In some examples, the liquid metal bearing rotating assembly may coast down for a designated period of time during the cooling sequence. Additionally or alternatively, if the remaining power of the UPS is running low (e.g., less than seven (7) minutes of backup power remaining), the rotating assembly liquid metal bearing may be forced to begin coasting down to a stop. Additionally, the X-ray controller may receive at least one command or signal to return to normal operation and return power to the X-ray generator and X-ray tube if the main power source is restored.

The X-ray tube 310 needs to be cooled down after use to prevent damage to the X-ray tube components, especially the liquid metal bearing of the X-ray tube. In the event of a power outage (e.g., power from the main power source 122 being unavailable), a sequence for cooling down the X-ray tube is initiated to allow the X-ray tube to safely cool down before completely shutting the CT imaging system down. In some examples, when the X-ray tube cooling sequence is imitated, the X-ray controller may receive one or more signals (e.g., from the operator console 220) to initiate the liquid metal bearing rotating assembly to coast down to a stop. In one such example, a signal to initiate the cooling sequence may be sent after a hardware reset. Additionally or alternatively, the signal to initiate the liquid metal bearing rotating assembly to coast may be sent when the PDU 120 determines the UPS 124 only has a limited amount of backup power remaining. In other words, the UPS ethernet board 302 communicates with UPS 124 to inform the operator or technologist of the amount of backup power remaining in the UPS 124 and automatically determines how best to use the remaining backup power to protect the X-ray tube from being damaged.

Though a CT imaging system is described by way of example, it should be understood that the present systems and methods may also be useful when applied to other multi-modality imaging systems with an X-ray source or X-ray tube, such as a positron emission tomography and computed tomography (PET/CT) imaging system or a single photon emission computed tomography and computed tomography (SPECT/CT) imaging system.

Figure 4:
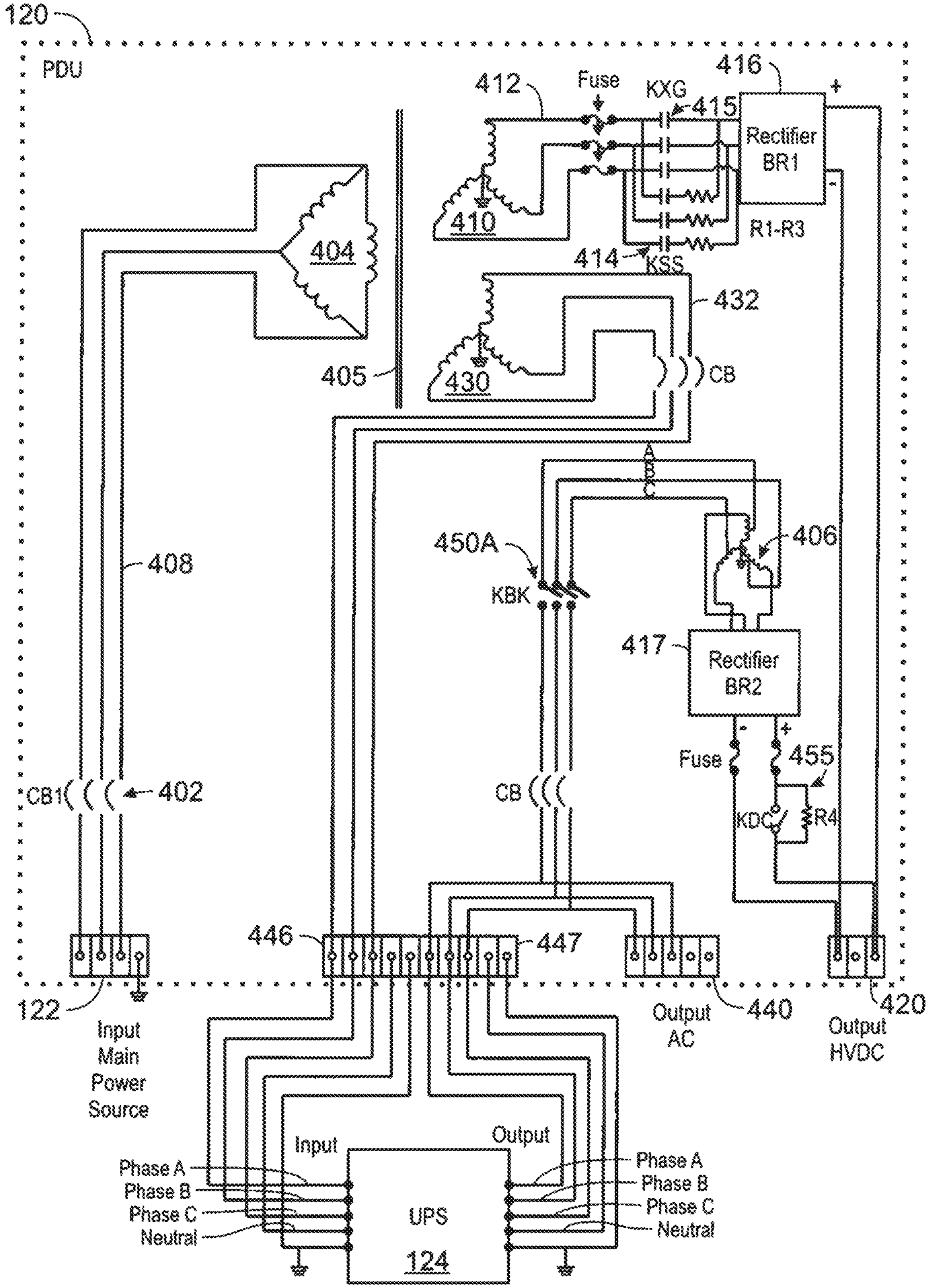
FIG. 4 illustrates a schematic diagram of a power distribution unit (PDU) with an uninterruptible power supply (UPS) coupled to the PDU, according to an embodiment.

FIG. 4 is a schematic diagram of a PDU 120 with an UPS 124 coupled to the PDU 120, according to an embodiment. An embodiment of a power interface of the UPS 124 and the main power source 122 with the PDU 120 is shown. As such, components previously introduced may be similarly numbered in these figures. The PDU 120 may receive three-phase AC input power from a main power source 122, a circuit breaker 402, three phase AC power wiring 408, and a three phase input 404 to a transformer 405. The transformer 405 may have a primary winding or three phase input 404, a first secondary winding 410 and a second secondary winding 430. The circuit breaker 402 may be configured to trip in response to over 150 Amps of current flowing through the three phase AC power wiring 408.

The first secondary winding 410, which may include a higher voltage than the second secondary winding 430, may direct power, via electrical wiring 412, through fuses and other electrical components to a rectifier 416. In some examples, the electrical wiring 412 may be coupled to fuses configured to disrupt the circuit in response to a current flow through the electrical wiring 412 exceeding a rating of the fuses. A plurality of contactors KXG 415 and KSS 414 may be positioned between the first secondary winding 410 and the rectifier 416. The rectifier 416 may be a passive or active rectifier, configured to convert alternating current (AC) to direct current (DC) at the output of the rectifier 416. The output of the rectifier 416 is coupled to an output high voltage DC (HVDC) load 420, which may be coupled to and supply power to components coupled to the rotating gantry assembly. In one example, the HVDC may be greater than 600 VDC.

The second secondary winding 430 may direct three phase AC power, via electrical wiring 432 and a circuit breaker to an input 446 of the UPS 124. An output 447 of the UPS 124 provides three phase AC power to the PDU 120 and an output AC load 440 of the PDU 124. The output AC load 440 provides power to other components of the CT imaging system, such as the operator console, a power cabinet, the computing device, etc. The three phase AC output of the UPS may be also be provided to the PDU 120 through a circuit breaker and contactor KBK 450A to an auto-transformer 406. The output of the auto-transformer 406 is coupled to a rectifier 417, which converts the three phase AC input to a HVDC output. The HVDC output of rectifier 417 may be coupled to fuses and contactor KDC 455 to the output HVDC load 420.

Figure 5:
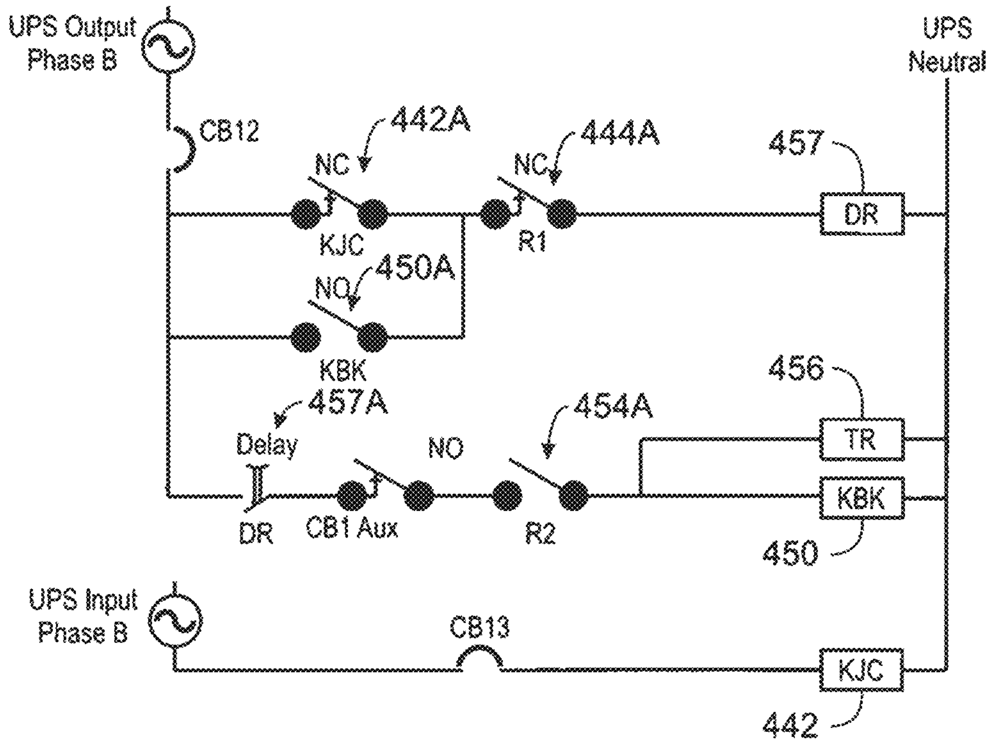
FIG. 5 illustrates a schematic diagram of a first control circuit of the PDU, according to an embodiment.
Figure 6:
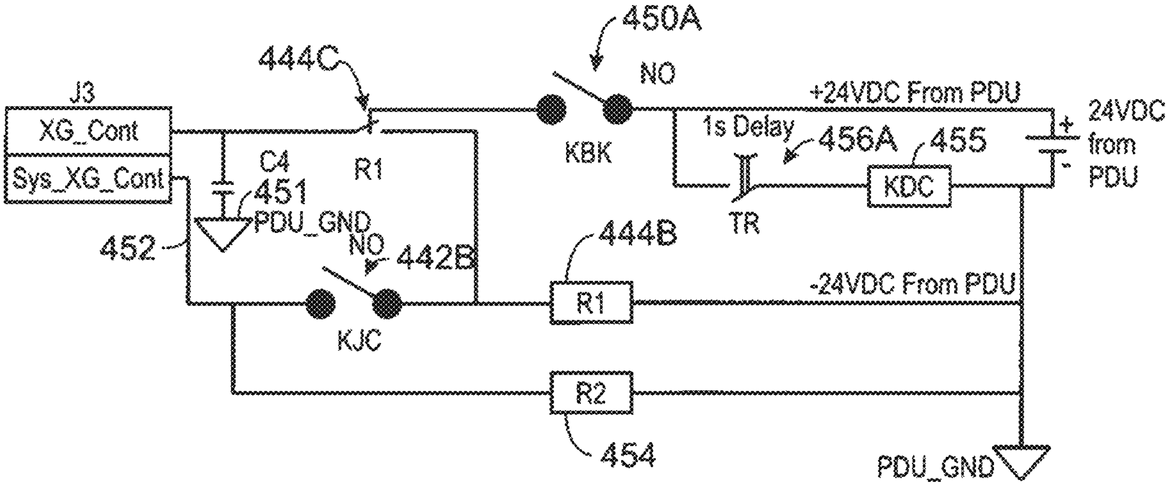
FIG. 6 illustrates a schematic diagram of a second control circuit of the PDU, according to an embodiment.

FIGS. 5 and 6 are a first control circuit (FIG. 5) of the PDU and a second control circuit (FIG. 6) of the PDU, according to an embodiment. The first and second control circuits receive power from an AC output phase B of the UPS and a 24 VDC from the PDU. An input phase B of the UPS 124 provides 120V to the first control circuit. Only a single AC phase (e.g., phase B) is used to provide power to the first control circuit because only one phase is needed to enable the first control circuitry to determine whether a power outage has occurred, and to trigger the response to the power outage. Specifically, contactor KJC 442 is the trigger for the response to the power outage because the KJC contactor is operative to detect a power outage of the main power source from the UPS via phase B. In alternative embodiments, the power could come from either phase A or phase C instead. The second control circuit is coupled to a gantry control board via connector J3 and signals XG_Cont and Sys_XG_Cont.

The first and second control circuits include a plurality of three phase contactors KJC 442, 442A and 442B; KBK 450, 450A; KDC 455, 450A; a plurality of timers: DR 457, 457A; TR 456, 456A; and a plurality of relays R1 444, 444A, 444B, 444C and R2 454, 454A. In an exemplary example, DR 457 closes after a ten (10) second delay from the time the main power from the main power source 122 becomes unavailable, KBK 450A closes following an XG_Cont signal, and TR 456 and KDC 455 are closed one (1) second after KBK 450A closes. The gantry control board sends a signal XG_Cont to the PDU. The example XG_Cont signal may be provided after a delay (e.g., 12.5 seconds after a power outage). This signal begins the X-ray tube cooling sequence. The delay prior to the XG_Cont signal ensures that power from the main power source 122 is unavailable for a significant enough time period to begin the X-ray tube cooling sequence, instead of being a temporary power interruption or power surge.

Figure 7:
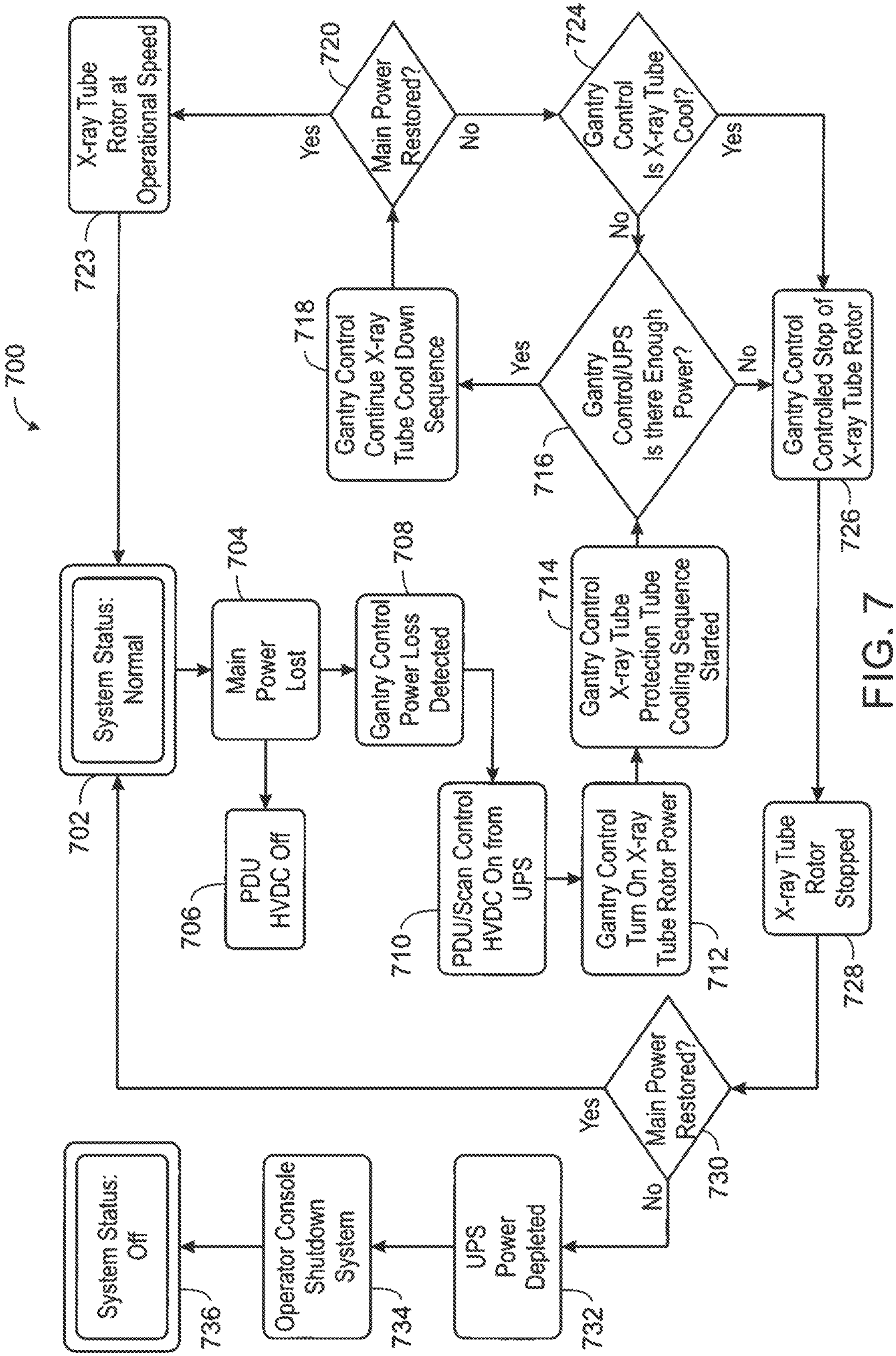
FIG. 7 illustrates a flow diagram of a system and method of controlling switching a backup power supply of a UPS to the CT imaging system in response to an interruption or outage of a main power source and controlling return of the CT imaging system to the main power source after the main power source is restored, according to an embodiment.

FIG. 7 is a flow diagram of a system and method of controlling switching a backup power supply of a UPS to the CT imaging system in response to an interruption or outage of a main power source and controlling return of the CT imaging system to the main power source after the main power source is restored, according to an embodiment. For example, if the main power source becomes unavailable, the system will automatically switch to backup power from the UPS. The UPS is operative to provide backup power during an X-ray tube cooling sequence that is part of a safe shutdown of the CT imaging system and preventing damage to the X-ray tube. Executable instructions for the method may be stored in memory of electronic components and executed by the computing device and/or the PDU controller. The PDU controller may be configured to receive inputs from one or more sensors of sensor circuitry in the PDU for continuously monitoring the availability of power from the main power source, to detect power interruptions or power outages in real time and automatically switch to backup power from the UPS when an interruption of power or a power outage of the main power source is detected.

The method 700 begins at 702, which includes the CT imaging system operating under normal conditions. Normal conditions may include receiving power form a main power source, such as a utility power source. While operating under normal conditions, all functions of the CT imaging system are available. During operation of the CT imaging system, there may be a loss of power in step 704 from the main power source. Under a power outage of the main power source, there is no HVDC power from PDU to the gantry in step 706. In step 708, the gantry control board detects the loss of power. With no power being supplied to the gantry, many of the functions of the CT imaging system are not operational. After a certain amount of delay time (e.g., 12.5 seconds) the gantry control board may send a signal to the PDU control board in the PDU controller and/or the operator console to switch to backup power from the UPS to supply HVDC to the gantry in step 710. The delay is to ensure that the power outage is not merely a limited power interruption or power surge that would not require the cooling sequence to begin.

When the backup HVDC power has been successfully turned on, the gantry control board sends a command to start supplying the power to the X-ray generator, including the X-ray controller and the X-ray tube in step 710. The X-ray tube protection mechanism is triggered to begin control of the rotating assembly of the liquid metal bearing in the X-ray tube and initiate the X-ray tube cooling sequence in step 712. The gantry control board and/or the PDU control board starts monitoring the remaining backup power information from UPS. In step 714, the gantry control board and/or the PDU control board determines whether there is enough backup power remaining in the UPS to proceed with the X-ray tube cooling sequence. If the gantry control board and/or the PDU control board determines there is enough backup power left in the UPS in step 716, the cooling sequence continues in step 718. In the cooling sequence, the gantry control board and/or the PDU control board continue to monitor the status of the main power source to determine whether utility power has been restored in step 720. If the main power is restored before the X-ray tube's liquid metal bearing rotating assembly cooling sequence is completed in step 722, the gantry control board and/or the PDU control board will cancel the X-ray tube's liquid metal bearing rotating assembly cooling sequence and the rotating assembly returns to a normal operating state in step 702. The system is able to return to normal operating conditions without any additional actions or intervention from an operator or technologist.

If in step 718, the main power source 122 is not restored during the rotating assembly cooling sequence, the gantry control board and/or the PDU control board will check if the required rotating assembly cooling sequence is completed in step 724. If in step 724, the rotating assembly cooling sequence is not completed, the gantry control board and/or the PDU control board will continue to monitor the backup power remaining in the UPS in step 716 and the status of the main power source in step 720 until either the main power is restored, thus returning the CT imaging system to normal operations, or the cooling sequence is complete. The system is able to return to normal operating conditions without any additional actions or intervention from an operator or technologist.

If in step 724 the cool down sequence is complete, or if in step 716 there is not sufficient backup power remaining in the UPS to complete the cooling sequence, the gantry control board and/or the PDU control board initiates a controlled stop of the rotating assembly in step 726. After a few minutes have passed, the rotating assembly has stopped in step 728. The gantry control board and/or the PDU control board continues to monitor the status of the main power source, checking if the utility power is restored in step 730. If the main power source is restored, the system returns to normal operating conditions in step 702. If the main power source is not restored, the system will remain in a waiting state until the UPS backup power is close to being fully depleted (e.g., less than three (3) minutes remaining) in step 732. When the UPS backup power is close to being fully depleted, the system will automatically start to shut down to prevent unexpected damage to the CT imaging system because of a sudden power loss in step 734. Thus, the CT imaging system is shut down in a controlled manner and is shut off in step 736. The method 700 is complete.

Figure 8:
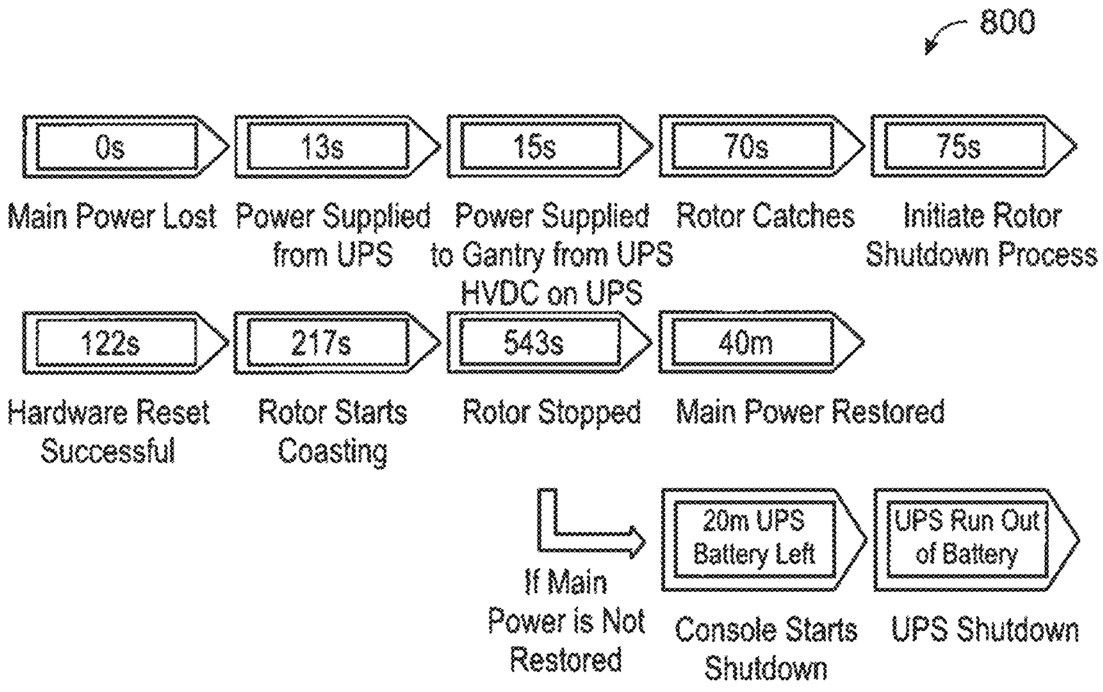
FIG. 8 illustrates a method including a timing sequence that occurs after a main power outage to control switching a backup power supply to the CT imaging system in response to the main power outage to prevent a hot landing of a liquid metal bearing of an X-ray tube of a CT imaging system, according to an embodiment.

FIG. 8 is another depiction of a method 800 including a timing sequence that occurs after a main power outage to control switching to a backup power supply of the UPS to the CT imaging system in response to the main power outage to prevent a hot landing of a liquid metal bearing rotating assembly of an X-ray tube of a CT imaging system. A hot landing of a liquid metal bearing rotating assembly of an X-ray tube may occur during a power outage. When the rotating assembly of a liquid metal bearing is landed (i.e., rotation stopped) in a uncontrolled way, due to a loss or power to the X-ray tube, especially when the X-ray tube is hot, there is a possibilty of bearing seizures that could happen which requires replacement of the X-ray tube. Therefore, if there is a power outage, it is desirable to switch backup power to the X-ray tube so that the X-ray tube may cool down and the rotating assembly of the liquid metal bearing gradually coast to a stop.

In an exemplary embodiment, a method to switch power to the CT imaging system after a main power loss from the main power to a backup power form the UPS begins at zero (0) seconds by the gantry control board and/or the PDU control board detecting a main power outage (i.e., a main power loss where PDU is not supplying power to the gantry and X-ray tube). After a short time period (e.g., 13 seconds) the UPS begins supplying power to the gantry and the X-ray tube. The gantry control board sends a signal to imitate switching power from the main power source to backup power from the UPS to the gantry. After a few more seconds (e.g., 15 seconds after a main power loss), HVDC power is being supplied to the gantry and X-ray tube from the UPS. The gantry control board detects power being supplied by the UPS. A warning message may be displayed on the user display indicating a main power loss and a an imaging reconstruction freeze.

Approximately 70 seconds after a main power loss, status of the rotating assembly of the liquid metal bearing of the X-ray tube may be displayed on a user interface on a display and the rotating assembly catches and continues to rotate. Shortly thereafter (e.g. at approximately 75 seconds after a main power loss), a rotating assembly shutdown process (cooling sequence) is initiated. During this time, the rotating assembly speed of the liquid metal bearing is approximately 50 Hz and a heat exchanger pump is operating at 5 volts. At approximately 122 seconds after a main power loss, a scanning hardware reset is completed. At approximately 217 seconds after a main power loss, the rotating assembly shutdown process (cooling sequence) has reached a point where the rotating assembly starts coasting. In some exemplary embodiments, the rotating assembly coasting is initiated when a remaining amount of time the UPS can supply backup power is approximately seven (7) minutes or less. At approximately 543 seconds after a main power loss, the rotating assembly of the liquid metal bearing of the X-ray tube comes to a stop and stops rotating. The rotating assembly will naturally coast to a stop as coasting winds down. A message may be displayed on the user interface display indicating that the rotating assembly has stopped rotating. If the main power source is restored at this point, the CT imaging system returns to normal operating conditions after approximately 40 minutes after a main power loss. The CT imaging system returns to normal operating conditions automatically without any action or intervention from the operator or technologist. A message may be displayed on the user interface display indicating that the CT imaging system is under normal operating conditions and image reconstruction in unfrozen. If the main power source is not restored after the rotating assembly has stopped rotating, there may be approximately 20 minutes of backup power remaining in the UPS. At this point, the operator console shuts down and the UPS shuts down, as there is no remaining backup power.

Figure 9:
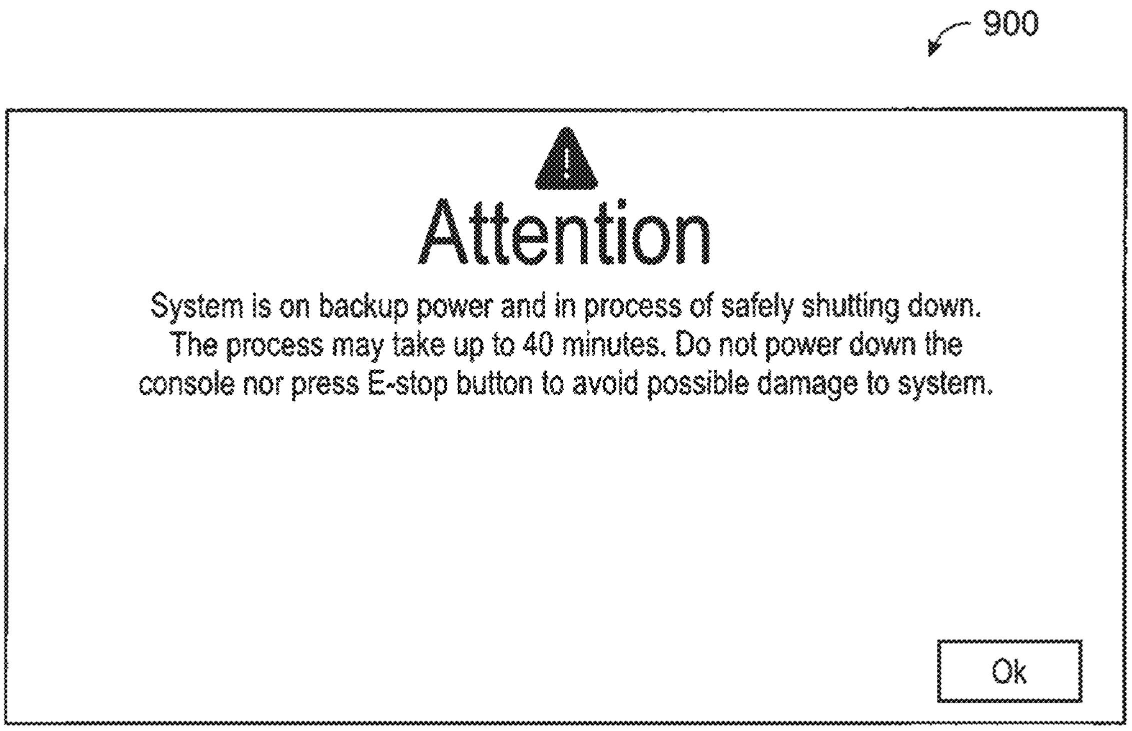
FIG. 9 illustrates a warning message that may be displayed on a user interface when a CT imaging system is on backup power and in the process of shutting down, according to an embodiment.

FIG. 9 is an example warning message 900 that may be displayed on the user interface display 232 when a CT imaging system is on backup power and in the process of shutting down. The example warning message 900 provides information that the CT imaging system is on backup power and in the process of safely shutting down. The warning message 900 may also include an estimated amount of time for the shutdown process and instructions for the operator or technologist. Additionally or alternatively, other warning messages may be displayed on the user interface display 232, such as an indication that UPS backup power may be depleted soon and the system will be shutting down, and indication of the remaining amount of UPS backup power, an indication that the main power source has been restored and normal operations can resume, etc.

As used herein, an element or step recited in the singular and proceeded with the word “a” or “an” should be understood as not excluding plural of said elements or steps, unless such exclusion is explicitly stated. Furthermore, references to “one embodiment” of the invention do not exclude the existence of additional embodiments that also incorporate the recited features. Moreover, unless explicitly stated to the contrary, embodiments “comprising,” “including,” or “having” an element or a plurality of elements having a particular property may include additional such elements not having that property. The terms “including” and “in which” are used as the plain language equivalents of the respective terms “comprising” and “wherein.” Moreover, the terms “first,” “second,” and “third,” etc. are used merely as labels, and are not intended to impose numerical requirements or a particular positional order on their objects.

The methods and/or processes disclosed herein may be stored as executable instructions in non-transitory memory and may be carried out by at least one processor or a control system including at least one controller in combination with the various sensors, actuators, contactors, switches and other electrical or electronic hardware. The specific methods and/or processes described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing or steps is not necessarily required to achieve the features and advantages of the exemplary embodiments described herein, but is provided for ease of illustration and description. One or more of the illustrated actions, functions, operations and/or steps may be repeatedly performed depending on the particular strategy being used. Further, the described actions, functions, operations and/or steps may graphically represent code to be programmed into non-transitory memory of the computer readable storage medium in the system an/or one or processors, where the described actions are carried out by executing the instructions in a system including the various electrical and electronic components in combination with the system or one or more controllers.

Embodiments of the present disclosure shown in the drawings and described above are example embodiments only and are not intended to limit the scope of the claims, including any equivalents as included within the scope of the claims. Various modifications are possible and will be readily apparent to the skilled person in the art. It is intended that any combination of non-mutually exclusive features described herein are within the scope of the disclosure. That is, features of the described embodiments can be combined with any appropriate aspect described above and optional features of any one aspect can be combined with any other appropriate aspect. Similarly, features set forth in dependent claims can be combined with non-mutually exclusive features of other dependent claims, particularly where the dependent claims depend on the same independent claim. Single claim dependencies may have been used as practice in some jurisdictions require them, but this should not be taken to mean that the features in the dependent claims are mutually exclusive.

What is claimed is:

1. A method for providing backup power to a computed tomography (CT) imaging system, the method comprising:
- monitoring the availability of power from a main power source to the CT imaging system;
- providing backup power to the CT imaging system via an uninterruptible power supply (UPS);
- distributing, via a power distribution unit (PDU), the backup power from the UPS to the CT imaging system;
- initiating, after waiting a period of time, a cooling sequence for an X-ray tube of the CT imaging system; and
- monitoring, during the cooling sequence, the remaining backup power from the UPS.

2. The method of claim 1, wherein detecting a power outage of the main power source, automatically switching power to the CT imaging system from the main power source to the backup UPS power source.

3. The method of claim 1, further comprising detecting restoration of power from the main power source and automatically switching power to the CT imaging system from the backup UPS power source to the main power source.

4. The method of claim 1, further comprising displaying an indication of CT imaging system status and power availability on a display of an operator console coupled to the CT imaging system upon providing backup power to the CT imaging system.

5. The method of claim 3, further comprising returning the CT imaging system to a normal operating condition after automatically switching power to the CT imaging system from the backup UPS power source to the main power source.

6. The method of claim 1, further comprising determining if an amount of backup power remining in the UPS is sufficient to complete the cooling sequence.

7. The method of claim 6, further comprising forcing a rotating assembly of the X-ray tube to coast if the amount of backup power remaining in the UPS is not sufficient to complete the cooling sequence.

8. The method of claim 1, wherein the cooling sequence includes sending at least one signal to an X-ray controller to begin the cooling sequence and prevent hot landing of the X-ray tube.

9. A computed tomography (CT) imaging system, comprising:
- a gantry;
- an X-ray source including an X-ray Generator and an X-ray tube; coupled to the gantry;
- a gantry controller coupled to the gantry;
- an X-ray controller coupled to the X-ray source;
- a power distribution unit (PDU) coupled to the gantry;
- a main power source coupled to the PDU for supplying power to the CT imaging system;
- a PDU controller coupled to the PDU; and
- an uninterruptable power supply (UPS) coupled to the PDU to provide backup power to the CT imaging system;
- wherein the PDU is configured to distribute the backup power from the UPS to the CT imaging system during a power outage of the main power source; and
- wherein the gantry controller is configured to initiate a cooling sequence for the X-ray tube during the power outage of the main power source, wherein the PDU controller is configured to send at least one signal to an X-ray controller to begin the cooling sequence and prevent hot landing of the X-ray tube.

10. The CT imaging system of claim 9, wherein the PDU controller is configured to monitor the main power source for a power outage.

11. The CT imaging system of claim 10, wherein the PDU controller detecting a power outage of the main power source, automatically switches power to the CT imaging system from the main power source to the backup UPS power source.

12. The CT imaging system of claim 10, wherein the PDU controller detecting restoration of power from the main power source, automatically switches power to the CT imaging system from the backup UPS power source to the main power source.

13. The CT imaging system of claim 9, wherein the cooling sequence includes monitoring a remaining amount of backup power of the UPS to determine if the remaining amount of backup power is sufficient to complete the cooling sequence.

14. The CT imaging system of claim 13, wherein the gantry controller continues the cooling sequence if the remaining amount of backup power is sufficient to complete the cooling sequence.

15. The CT imaging system of claim 9, wherein the X-ray tube includes a liquid metal bearing having a rotating assembly.

16. The CT imaging system of claim 9, wherein the gantry controller is configured to stop the CT imaging system from performing imaging scans upon detecting a power outage of the main power source.

17. The CT imaging system of claim 9, further comprising displaying an indication of CT imaging system status and power availability on a display of an operator console coupled to the CT imaging system upon providing backup power to the CT imaging system.

18. A smart power method to protect an X-ray tube of a CT imaging system during a power outage, the method comprising:

monitoring a remining amount of power from a backup power source supplied by an UPS coupled to a PDU that is providing power to the CT imaging system;

the X-ray tube having a liquid metal bearing rotating assembly; and automatically determining where to supply the remaining amount of backup power to prevent a hot landing of the X-ray tube liquid metal bearing rotating assembly.

* * * * *